(12) United States Patent  
　　　Held (10) Patent No.: US 11,401,964 B2
(45) Date of Patent: Aug. 2, 2022

(54) DETACHABLE HANDLE FASTENING COUPLING FOR WORKING IMPLEMENTS

(71) Applicant: MTD Products Inc, Valley City, OH (US)

(72) Inventor: Peter Held, Scheuerfeld (DE)

(73) Assignee: MTD PRODUCTS INC, Valley City, OH (US)

( * ) Notice: Subject to any disclaimer, the term of this patent is extended or adjusted under 35 U.S.C. 154(b) by 829 days.

(21) Appl. No.: 15/790,646

(22) Filed: Oct. 23, 2017

(65) Prior Publication Data

US 2018/0112700 A1　Apr. 26, 2018

(30) Foreign Application Priority Data

Oct. 21, 2016　(DE) .......................... 102016012586.1

(51) Int. Cl.
　　*F16B 21/12*　(2006.01)
　　*B25G 3/18*　(2006.01)
　　*B25G 3/26*　(2006.01)
(52) U.S. Cl.
　　CPC .............. *F16B 21/125* (2013.01); *B25G 3/18* (2013.01); *B25G 3/26* (2013.01)
(58) Field of Classification Search
　　CPC ........... F16B 21/125; B25G 3/18; B25G 3/26; B25G 3/14; B25F 1/02; B25F 1/04; Y10T 16/469; Y10T 16/473
　　See application file for complete search history.

(56) References Cited

U.S. PATENT DOCUMENTS

| 825,976 | A | * | 7/1906 | Neiglick | B26B 5/001 30/162 |
| 3,774,252 | A | * | 11/1973 | Cantales | B44D 3/105 7/105 |
| 4,466,377 | A | * | 8/1984 | Kolb | B25G 3/18 16/422 |
| 4,870,757 | A | * | 10/1989 | Kirkpatrick | B23D 51/01 30/344 |

(Continued)

FOREIGN PATENT DOCUMENTS

DE　　　3143080 A1　　5/1983
DE　　32 46 887 A1　　8/1983

(Continued)

OTHER PUBLICATIONS

Search Report dated Nov. 10, 2017 from European Published Patent Application No. 3 318 368 A1 dated Nov. 10, 2017.

*Primary Examiner* — Matthew R McMahon
(74) *Attorney, Agent, or Firm* — Wegman Hessler (57) ABSTRACT

A handle fastening coupling, preferably for household and gardening implements comprises a guide piece (12) that is pressed into a handle-tube end and has an elongated guide channel (14) for a handle insert pin (3), which has a first end fastened to the implement and second free end, wherein the second end has a lock opening (6); and a locking element (20) that is preloaded by a latch spring (18) in a first radial direction perpendicular to the handle axis and that is designed to snap into the lock opening of the handle insert pin, wherein the locking element can be moved out of the lock opening in the radial direction by an operating button in order to release the handle insert pin (3) to pull it out of the guide channel.

13 Claims, 7 Drawing Sheets

(56) References Cited

U.S. PATENT DOCUMENTS

| | | | | | |
|---|---|---|---|---|---|
| 5,477,758 | A | * | 12/1995 | Cunningham | ...... B25B 27/0035 |
| | | | | | 81/124.4 |
| 5,535,484 | A | * | 7/1996 | Gibson | ................... A47J 45/10 |
| | | | | | 16/430 |
| 6,055,733 | A | * | 5/2000 | Chen | ....................... A47G 21/10 |
| | | | | | 16/429 |
| 6,370,990 | B1 | * | 4/2002 | Lin | ......................... B25B 13/04 |
| | | | | | 81/177.2 |
| 7,625,033 | B2 | * | 12/2009 | Michelau | ................ B62B 9/147 |
| | | | | | 296/177 |
| 7,805,843 | B2 | * | 10/2010 | Landsberger | .......... A47G 21/02 |
| | | | | | 30/147 |
| 8,096,213 | B2 | * | 1/2012 | Miers | ........................ B25F 1/02 |
| | | | | | 81/177.85 |
| 8,844,942 | B1 | | 9/2014 | Landowski et al. | |
| 8,856,995 | B2 | * | 10/2014 | Arvinte | ................... B25F 1/006 |
| | | | | | 7/165 |
| 10,478,949 | B2 | * | 11/2019 | White, II | ................ B25B 23/16 |
| 2002/0073554 | A1 | * | 6/2002 | Chen | ........................ B25G 3/18 |
| | | | | | 30/169 |
| 2018/0178369 | A1 | * | 6/2018 | Chen | ........................ B25G 3/18 |

FOREIGN PATENT DOCUMENTS

| | | | | |
|---|---|---|---|---|
| DE | 3246887 | A1 | 8/1983 | |
| DE | 3519544 | A1 | 12/1986 | |
| DE | 102005048867 | A1 | 4/2007 | |
| DE | 102009005814 | A1 | 7/2010 | |
| EP | 1369209 | A2 * | 12/2003 | ............. B25G 1/105 |
| FR | 2975033 | A1 * | 11/2012 | ............... B25G 3/18 |
| WO | WO 03057419 | A1 | 7/2003 | |
| WO | WO-2015176970 | A1 * | 11/2015 | ............... B25G 3/14 |

\* cited by examiner

DETACHABLE HANDLE FASTENING COUPLING FOR WORKING IMPLEMENTS

Detachable handle fastening couplings have prevailed in the field of gardening equipment. Various advantages for the user are associated therewith. The implements can be combined with various handle lengths. A handle does not have to be purchased for each device. In particular, expensive extendible handles can be used for various devices such as sheers or a saw. That saves money and reduces the storage space required. In general, in the case of these detachable handle fastening couplings, a difference can be made between basic non-positive-locking and positive-locking types.

A form fit-locking connection between a gardening implement and an implement handle is known, for example, from DE3246887 A1, that describes a smooth-running snap-lock connection between an implement insert pin attached to the implement and a guide piece attached to one end of the shaft that is provided with a guide bore for the insert pin. In the end position, the insert pin snaps in similar to a safety belt with a latch spring in a positive-locking manner. The latch spring has a protrusion that meshes into an opening on the free end of the implement insert pin and can be detached from this by means of an operating button. Pure positive-locking connections are associated with play at the joints depending on the system at hand. A reduction of play at the entry end of the guide bore can be achieved by inserting an elastic intermediate piece between the shaft and the device.

In contrast to this, force fit-locking connections seem free of play, for example, by locking the insert pin in a guide bore of the guide piece by means of a screw. This shaft handle fastening coupling is, however, time-consuming and cumbersome to use.

The object of the invention is to supplement the advantages of the form fit-locking connection by means of appropriate tolerance compensation that does not make operation difficult, but however, compensates the play in such a way that it no longer has a negative effect. Furthermore, the safety of the shaft handle fastening coupling should be increased in the case of accidentally pressing the operating button.

The object is obtained according to the invention by the features of claim 1. Favourable embodiments and further embodiments of the invention are set out in the dependent claims.

With the handle fastening coupling according to the invention, at least one further leaf spring or another elastic element is integrated into the guide piece and has a play-compensating effect, preferably on the free end of the handle insert pin.

In accordance to one embodiment, this is achieved by means of a pressure cam that, under pressure, meshes into a recess on the side surface of the handle insert pin, which preferably has a rectangular cross section, and clamps the handle insert pin. In this way, the tactile play is eliminated.

The pressure cam may also have another important function. In the case of accidentally pressing the operating button, the handle insert pin is still always held by the pressure cam. For example, in the case of a chopping movement, the implement will therefore not detach from the handle in an undesired manner, thereby possibly endangering bystanders.

The desired amount of the safety retaining force can be set via the compressive force of the cam, that is via the design of the further leaf spring or the elastic element and the shape of the recesses in the handle insert pin.

The invention will be explained in further detail below with reference to embodiments shown in the drawings.

Figure 1:
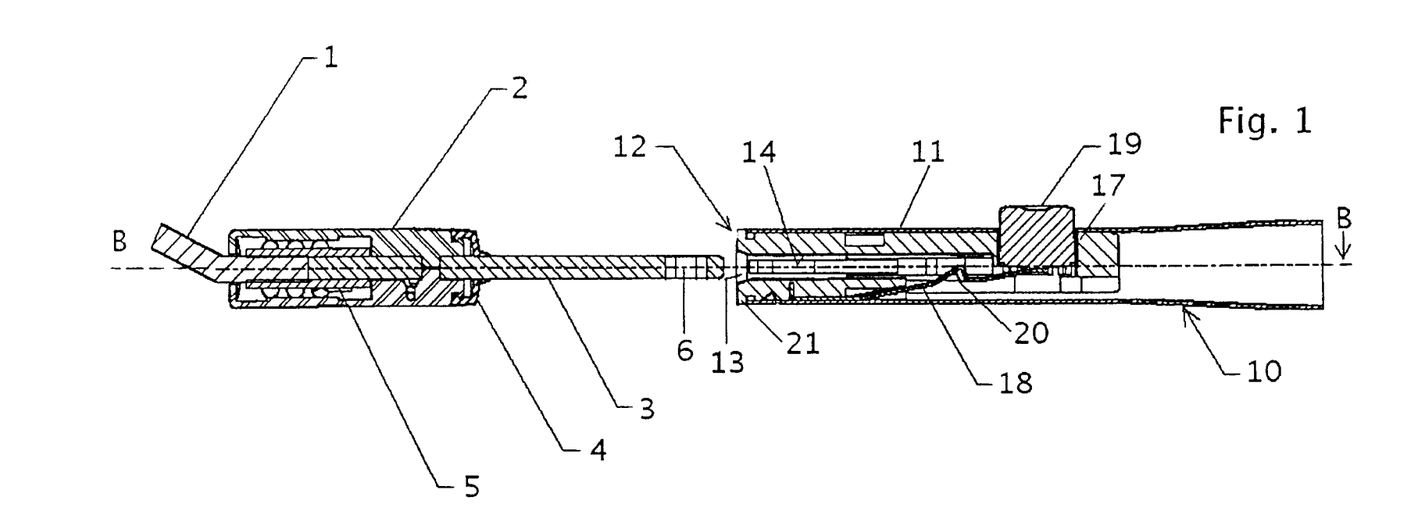
FIG. 1 a sectional side view of an embodiment of the handle fastening coupling when viewing along the section line A-A in FIG. 2.
Figure 2:
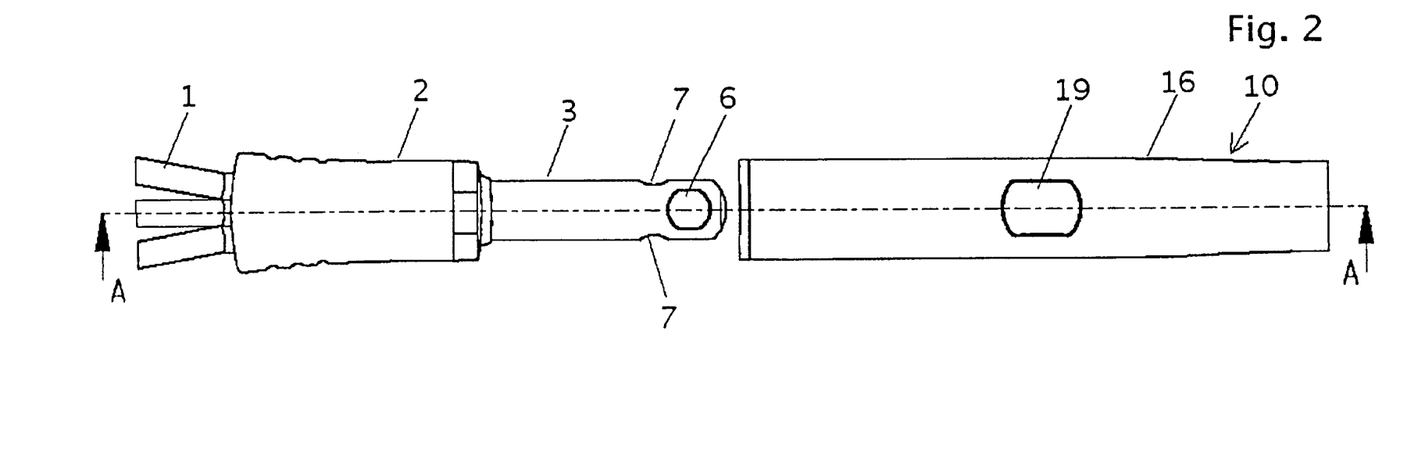
FIG. 2 a top view of the embodiment of the handle fastening coupling according to FIG. 1.

The figures show:

FIGS. 10a to 12a separate representations of the handle insert pin corresponding to FIGS. 10 to 12;

FIGS. 1 and 2 show a first embodiment of the handle fastening coupling between a working implement only shown broken away and a handle that show the basic ideas of the invention schematically.

The working implement 1 is connected to a handle insert pin via a handle piece 2, and the handle insert pin is adapted to be inserted into a guide channel 14 of a guide piece 12. The guide piece 12 is inserted into the end 11 of a handle tube 10 located adjacent to the working implement and fastened into it.

Within the guide piece 12 or between the guide piece and the inner wall of the end 11 of the handle tube 10, a first preloaded bent leaf spring 18 is secured and biased in the direction of the center of the end 11 that has a locking element 20 that projects into the guide channel 14, that meshes with a lock opening 6 provided on free end of the handle insert pin when the handle insert pin 3 is inserted, thereby locking the handle insert pin 3 within the guide piece 12 in the axial direction. Unlocking is possible by pressing an operating button 19 that is arranged in a guide bore 17 above the free end of the leaf spring 18 and can be pressed down.

Between the handle piece 2 and the outer end of the guide piece 12, there is preferably a compensation collar 4 that will be explained in more detail in relation to FIGS. 17 to 19 and serves to compensate axial play between the implement and the handle.

Even then, however, the problem of radial play remains, in particular, at the free end of the handle insert pin.

Figure 3:
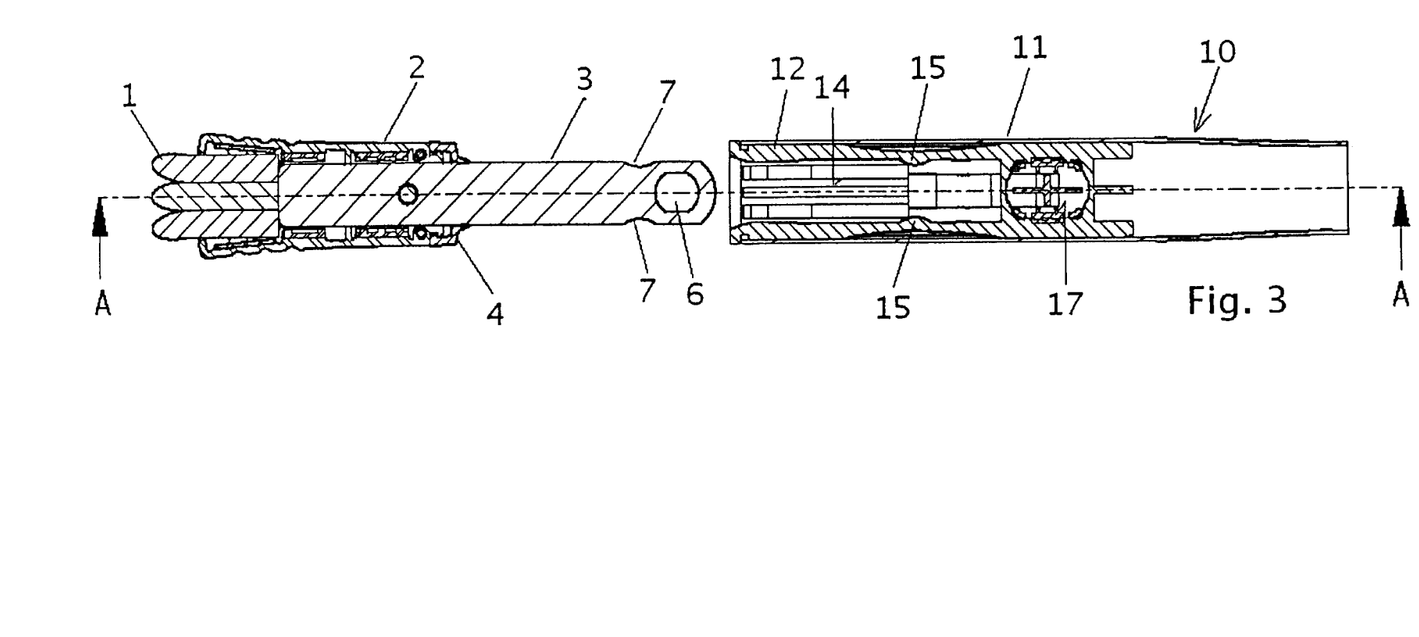
FIG. 3 another sectional view along the line A-A when viewing the embodiment of the handle fastening coupling from above.
Figure 4:
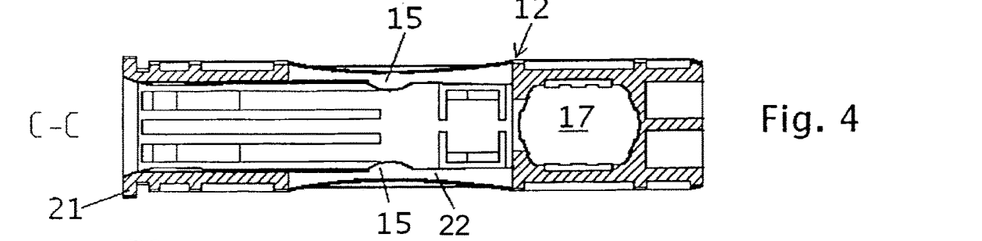
FIG. 4 a sectional view of an embodiment of the guide section along the section line c-C according to FIG. 5.
Figures 5, 6, 7:
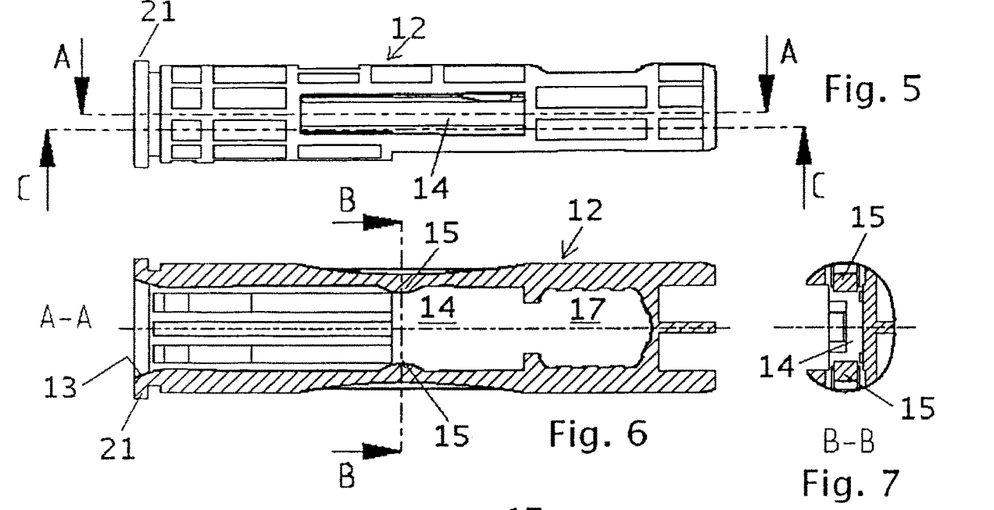
FIG. 5 an outer view of the guide piece of the handle fastening coupling
FIG. 6 a sectional view rotated by 90° with relation to FIG. 5 along the line A-A according to FIG. 5.
FIG. 7 a sectional view along the line B-B according to FIG. 6.
Figure 14:
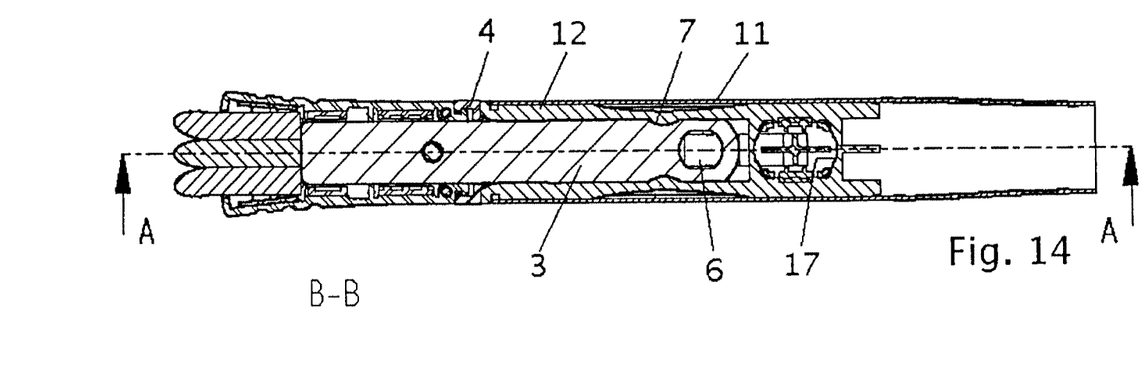
FIG. 14 a partial sectional view rotated by 90° with relation to FIG. 13 of the handle and the handle insert pin.

In accordance with a favourable embodiment, this radial play is eliminated by at least one pressure cam 15 that, subject to an elastic biasing or preloading, engages into one or a plurality of recesses 7 in the lateral surface of the handle insert pin 3, which preferably has a rectangular cross section, whererby the handle insert pin is clamped as may be seen in FIGS. 3 and 14 in particular. and in this way, the tactile play is eliminated.

The rectangular cross section of the handle insert pin is merely an example; other cross-section shapes can also be used in combination with a corresponding embodiment of the cross section of the guide channel, wherein the recesses 7 for the pressure cam(s) must be adapted accordingly.

The pressure cam(s) 15 also is adapted to fulfil another important function. In the case of accidentally pressing the operating button, the handle insert pin is still always held by the pressure cam. For example, in the case of a choppy movement, the implement will therefore not detach from the handle in an undesired manner, thereby possibly endangering bystanders.

The desired amount of the safety retaining force can be set via the compressive force of the cam, that is by designing the further leaf spring or the elastic element and the shape of the recesses within the handle insert pin.

Figure 13:
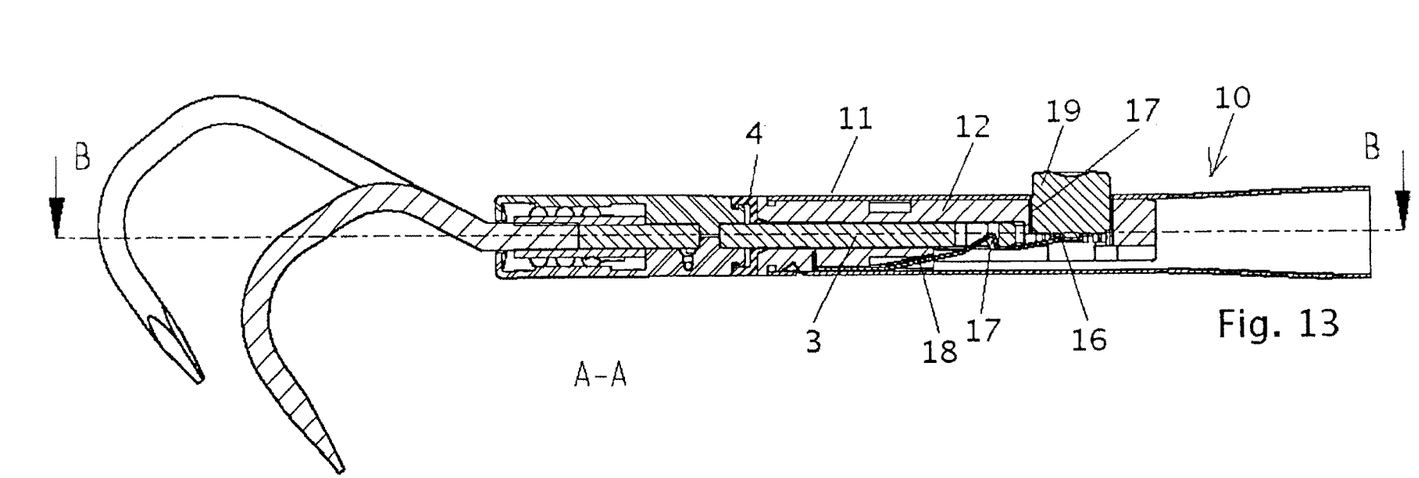
FIG. 13 a vertical sectional view through the free end of the handle and the guide piece when the handle insert pin is inserted.

In the drawings, pressure cams 15 are shown respectively that engage the sides of the handle insert pin 3. In the way same way, for example, in the case of the representation shown in FIG. 13, additional pressure cams can be arranged above and below the handle insert pin 3 in order to further reduce the radial play of the first back end of the handle insert pin 3.

An embodiment of the guide piece and the pressure cams 15 integrally formed with the guide piece and the further flat springs 22 biasing these pressure cams toward the inside in a radial direction may be seen from FIGS. 4 to 9. In the case of this embodiment, the further flat springs 22 and the pressure cams 15 are designed as a single piece with the guide piece 12 in the form of a plastic injection-moulded part that can then be inserted into the free end of the handle tube 10 up until the limit constituted by a peripheral flange 21 that is arranged on the outer end of the guide piece 12.

Figures 8, 9:
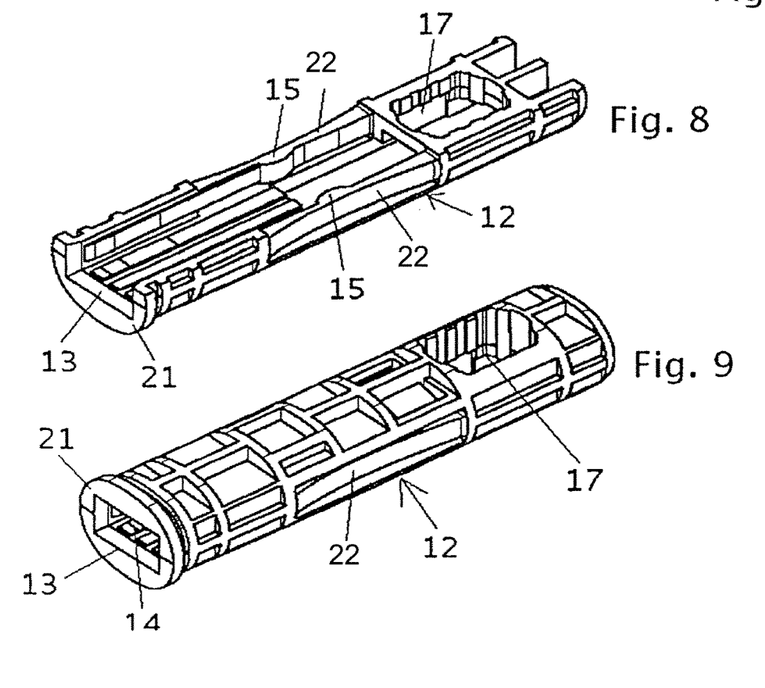
FIG. 8 a perspective representation of the guide piece in the representation according to FIG. 4.
FIG. 9 a perspective view of an embodiment of the guide piece according to the FIGS. 4 to 7.

As may be seen from FIGS. 8 and 9 in particular, this guide piece may also be formed by two halves that are held together in the handle tube after insertion in order to simplify the manufacturing process.

In the same manner, it is possible to design the further flat springs and the pressure cams as separate components, that are arranged in a corresponding peripheral recess of the guide piece 12 of this guide piece, encompassing it.

Figures 10, 11, 12:
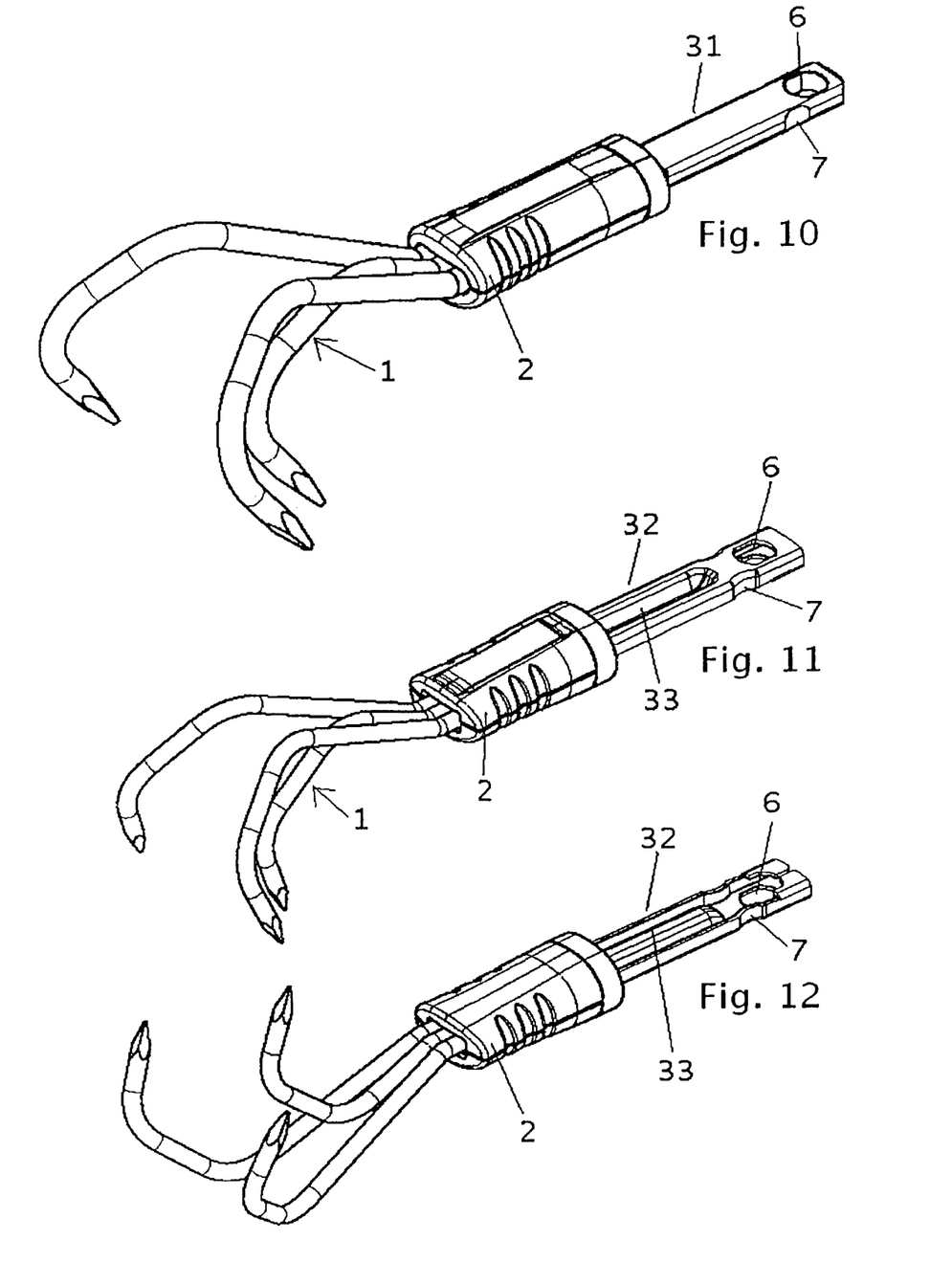
FIG. 10 a perspective view of a first embodiment of an implement comprising a first embodiment of the handle insert pin.
FIG. 11 a perspective view of a second embodiment of an implement comprising a second embodiment of the handle insert pin when viewed from above.
FIG. 12 a perspective view of a second embodiment of the handle insert pin according to FIG. 11 when viewed from below.
Figure 10A:
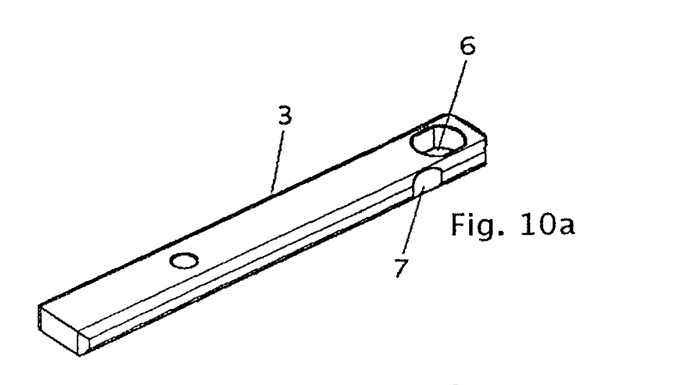
Figures 11A, 12A:
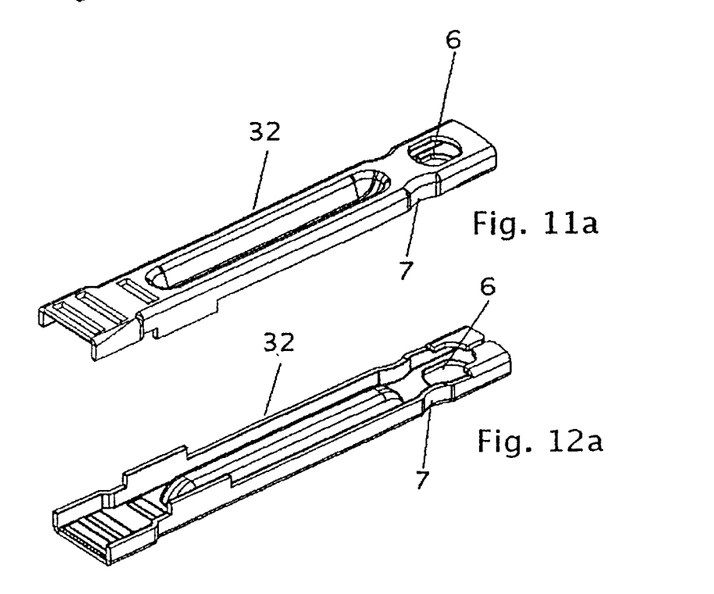

FIGS. 10 to 12 in combination with FIGS. 10*a* to 12*a* show two embodiments of the handle insert pin 3. The solid embodiment 31 shown in FIGS. 10 and 10*a* is used for larger devices. In the case of smaller handheld devices with lower levels of operating powers, a sheet-metal part 32 us used that can be reinforced by embossments 33. Both embodiments have the aforementioned recesses 6, 7 at the same position and in the same size so that they can be used with the same handles.

Figures 15, 17, 18, 19:
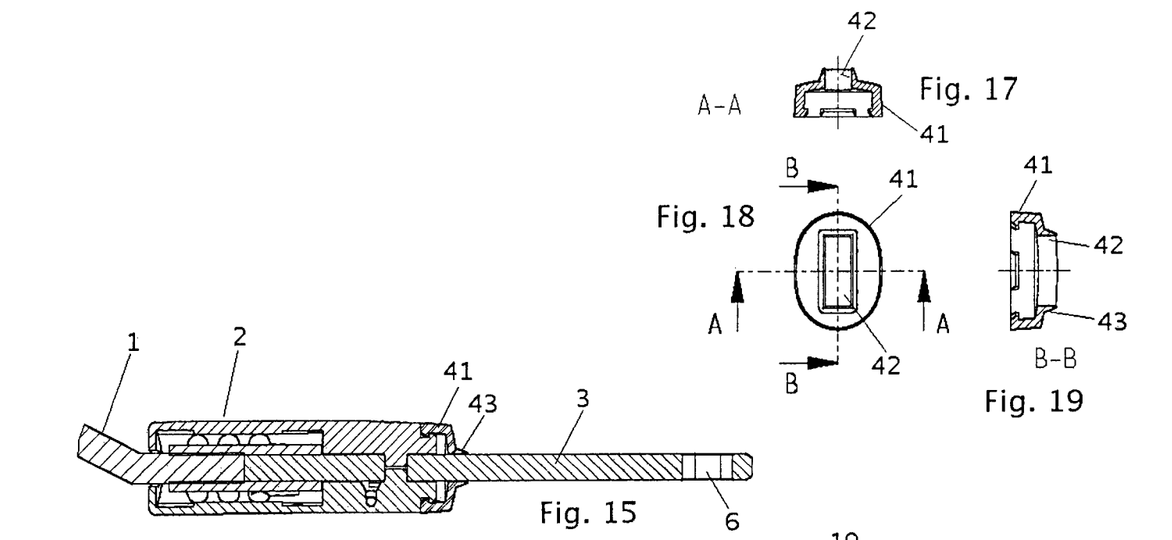
FIG. 15 a further embodiment of a handle of the implement and the handle insert pin.
FIG. 17 a partial representation of the compensation collar according to the embodiments according to FIGS. 15 and 17.
FIG. 18 a top view from above of the compensation collar.
FIG. 19 a sectional view along the line B-B according to FIG. 18.

FIGS. 17 and 19 show an embodiment of an elastic compensation collar 41 that is arranged between the outer end of the guide piece 12 and the handle piece 2. The collar 41 is domed and due to its shape is adapted, despite the long tolerance chain, to ensure a compensation of the axial play between the implement and the handle as is evident from a comparison of FIGS. 15 and 16.

The collar has a conical attachment 43 for fastening to the end of the handle piece 2 and to the end facing the guide piece, which can be inserted into the conical opening 13 of the guide piece. The handle insert pin 3 extends through an opening 42 in this collar.

Figure 16:
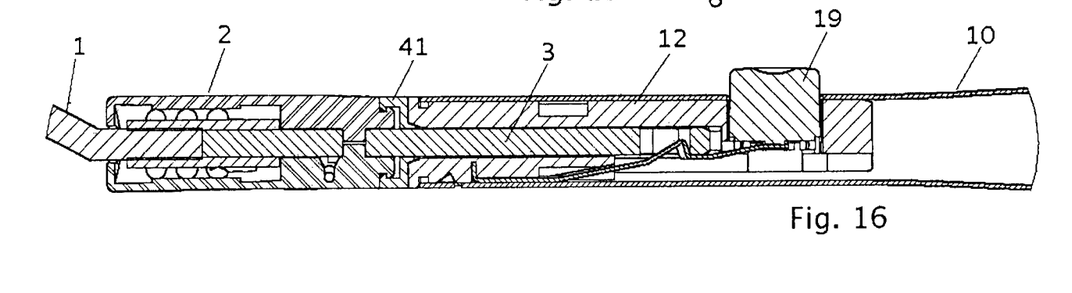
FIG. 16 a vertical section view of the handle and the handle insert pin when inserted into the guide piece.

In FIG. 15, this collar 41 is shown before inserting it into the guide piece 12, while in FIG. 16, the deformation of the collar can be seen after inserting it into the guide piece 12, which eliminates any radial and axial play on the free outer end of the guide piece 12.

In cooperation with the pressure cams, this results a very secure holding of the handle insert pin 3 in the guide piece 12 and the end of the shaft 10.

The invention claimed is:

1. A handle fastening coupling for a household or gardening implement comprising: a guide piece and a handle insert pin; said guide piece is pressed into a handle-tube end of a handle tube and comprises an elongated guide channel for said handle insert pin, which is adapted with regard to its shape and its dimensions to the guide channel, said handle insert pin having a first end attached to the household or gardening implement and a second free end, wherein the second end has a lock opening; and a locking element, which is preloaded by a latch spring in a first radial direction perpendicular to a handle axis of the handle tube and designed to snap into the lock opening of the handle insert pin, wherein the locking element can be moved out of the lock opening in the first radial direction by an operating button in order to release the handle insert pin to permit pulling it out of the guide channel, comprising:
at least one pressure cam being arranged adjacent to the lock opening of the handle insert pin when it is inserted into the guide channel, each of said at least one pressure cam is located on a flat spring elastically biased toward the inside of the guide channel of the guide piece by said flat spring, and is designed to exert radial forces at an angle to the first radial direction into at least one recess of the handle insert pin when the handle insert pin is inserted into the guide channel.

2. The handle fastening coupling according to claim 1, wherein the at least one pressure cam is adapted for exerting a radial force on the handle insert pin under an angle of more than 45 degrees to the first radial direction.

3. The handle fastening coupling according to claim 1, wherein at least two pressure cams are arranged on an inner circumference of the guide channel at angular distances from each other and are preloaded in a second radial direction onto respective recesses of the handle insert pin inserted into the guide channel.

4. The handle fastening coupling according to claim 3, wherein the flat spring and the at least one pressure cam biased thereby are adapted to exert a pressure that prevents the handle insert pin from falling out of the guide channel and act against play of the free end of the handle insert pin within the guide channel.

5. The handle fastening coupling according to claim 3, wherein the guide piece has a radial flange on an end protruding from the handle tube that limits the insertion position of the guide piece into the handle tube.

6. The handle fastening coupling according to claim 5, further comprising: an elastic compensation collar adapted for elimination of axial play and radial play of the handle insert pin relative to the guide channel is disposed between the radial flange and a handle piece and surrounds the first end of the handle insert pin.

7. The handle fastening coupling according to claim 6, wherein the compensation collar has a curved dome-shaped cup like shape, the bottom surface of which is arranged at a distance from the end of the handle piece that faces away from the implement when the handle insert pin is not inserted and is adapted to exert a preloaded force in the axial direction against the flange when the handle insert pin is inserted into the guide channel.

8. The handle fastening coupling according to claim 6, wherein the compensation collar has a frame-like conical protrusion on its side opposite to the end of the handle piece, the diameter of which is reduced in the direction away from the end of the handle piece, and that the conical protrusion is adapted to be inserted into a complimentary conical opening on the free end of the guide piece.

9. The handle fastening coupling according to claim 1, wherein the guide piece, the at least one flat spring and the at least one pressure cam are manufactured as a single piece formed of plastics.

10. The handle fastening coupling according to claim 1, wherein the guide piece is divided into two halves in the axial direction, the two halves being adapted to be pressed together on insertion thereof into the free end of the handle tube.

11. The handle fastening coupling according to claim 1, wherein the handle insert pin has a cross section that is substantially rectangular in the shape of a flat rod having narrow sides, the at least one recess being formed in the narrow sides thereof.

12. The handle fastening coupling according to claim 11, wherein the handle insert pin is designed as a solid rod.

13. The handle fastening coupling according to claim 1, characterized in that the handle insert pin is made as a sheet-metal part with reinforcement embossments as well as the lock opening and the at least one recess formed therein.

* * * * *